(12) United States Patent
White, III et al.

(10) Patent No.: US 12,025,020 B2
(45) Date of Patent: Jul. 2, 2024

(54) VANE SYSTEM WITH CONTINUOUS SUPPORT RING

(71) Applicant: RTX CORPORATION, Farmington, CT (US)

(72) Inventors: Robert A. White, III, Meriden, CT (US); Bryan P. Dube, Columbia, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/309,899

(22) Filed: May 1, 2023

(65) Prior Publication Data

US 2023/0323792 A1     Oct. 12, 2023

Related U.S. Application Data

(62) Division of application No. 17/313,099, filed on May 6, 2021, now Pat. No. 11,719,130.

(51) Int. Cl.
    *F01D 25/24*      (2006.01)
    *F01D 5/18*      (2006.01)
    *F01D 5/28*      (2006.01)
    *F01D 9/04*      (2006.01)
    *F02C 3/04*      (2006.01)

(52) U.S. Cl.
CPC ............. *F01D 25/246* (2013.01); *F01D 5/18* (2013.01); *F01D 9/041* (2013.01); *F01D 9/042* (2013.01); *F02C 3/04* (2013.01); *F01D 5/284* (2013.01); *F05D 2220/323* (2013.01); *F05D 2230/642* (2013.01); *F05D 2240/12* (2013.01); *F05D 2300/6033* (2013.01)

(58) Field of Classification Search
CPC .......... F01D 25/246; F01D 5/18; F01D 9/041; F01D 9/042; F01D 5/284; F01D 9/044; F01D 25/12; F01D 5/188; F01D 5/147; F02C 3/04
See application file for complete search history.

(56) References Cited

U.S. PATENT DOCUMENTS 2,925,998 A * 2/1960 Hayes .................... F01D 9/042
                                                       29/889.22
3,075,744 A      1/1963 Peterson
(Continued)

OTHER PUBLICATIONS

Extended European Search Report for EP Application No. 22171684.8 dated Jul. 6, 2022.

(Continued)

*Primary Examiner* — Brian Christopher Delrue
(74) *Attorney, Agent, or Firm* — Carlson, Gaskey & Olds, P.C.

(57) ABSTRACT

A vane system includes a plurality of vane assemblies and a continuous support ring. The vane assemblies are arranged circumferentially about an axis and each include a hollow airfoil fairing and a spar. The spar has a spar flange and a spar leg extending radially inwardly from the spar flange and through the hollow airfoil fairing. The continuous support ring has radially inner and outer sides and defines a circumferential row of through-holes between the radially inner and outer sides. The spar legs extend through the through-holes and the spar flanges are affixed at the radially outer side of the continuous support ring.

16 Claims, 12 Drawing Sheets

(56) References Cited

U.S. PATENT DOCUMENTS

| | | | |
|---|---|---|---|
| 4,563,128 A | 1/1986 | Rossman | |
| 5,197,856 A | 3/1993 | Koertge et al. | |
| 5,207,556 A | 5/1993 | Frederick et al. | |
| 5,332,360 A | 7/1994 | Correia et al. | |
| 6,164,903 A | 12/2000 | Kouris | |
| 6,200,092 B1 | 3/2001 | Koschier | |
| 6,884,030 B2 * | 4/2005 | Darkins, Jr. | F01D 9/042 29/889.22 |
| 6,929,445 B2 * | 8/2005 | Zatorski | F01D 5/188 415/115 |
| 7,452,182 B2 * | 11/2008 | Vance | F01D 5/147 415/189 |
| 8,690,531 B2 | 4/2014 | Tudor et al. | |
| 9,915,159 B2 | 3/2018 | Huizenga et al. | |
| 9,970,317 B2 * | 5/2018 | Freeman | F01D 25/005 |
| 10,605,086 B2 | 3/2020 | Zurmehly et al. | |
| 10,612,399 B2 | 4/2020 | Freeman et al. | |
| 10,655,482 B2 * | 5/2020 | Freeman | F01D 9/041 |
| 10,767,497 B2 * | 9/2020 | Vetters | F01D 25/005 |
| 10,934,868 B2 | 3/2021 | Thomas et al. | |
| 11,732,596 B2 * | 8/2023 | Clark | F01D 25/246 415/191 |
| 2005/0254942 A1 * | 11/2005 | Morrison | C04B 37/001 415/200 |
| 2013/0094951 A1 | 4/2013 | McCaffrey | |
| 2015/0377067 A1 * | 12/2015 | McCaffrey | F01D 25/162 415/200 |
| 2016/0169050 A1 * | 6/2016 | Scott | F02C 7/20 415/213.1 |
| 2016/0177761 A1 * | 6/2016 | Huizenga | F01D 9/047 415/209.3 |
| 2020/0340365 A1 * | 10/2020 | Whittle | F01D 5/282 |
| 2020/0362707 A1 | 11/2020 | Whittle | |

OTHER PUBLICATIONS

Dan Derry, "Rules of Thumb for Thread Engagement", Field Fastener, Mar. 13, 2018 (Year: 2018).

\* cited by examiner

VANE SYSTEM WITH CONTINUOUS SUPPORT RING

CROSS-REFERENCE TO RELATED APPLICATION

This application is a divisional of U.S. patent application Ser. No. 17/313,099 filed on May 6, 2021.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils.

SUMMARY

A vane system according to an example of the present disclosure includes a plurality of vane assemblies arranged circumferentially about an axis. Each of the vane assemblies has a hollow airfoil fairing and a spar. The spar has a spar flange and a spar leg that extends radially inwardly from the spar flange and through the hollow airfoil fairing. A continuous support ring has radially inner and outer sides and defines a circumferential row of through-holes between the radially inner and outer sides. The spar legs extend through the through-holes, and the spar flanges are affixed at the radially outer side of the continuous support ring.

A further embodiment of any of the foregoing embodiments includes a plurality of fasteners extending through the spar flanges to the radially inner side of the continuous support ring and affixing the spar flanges to the continuous support ring.

In a further embodiment of any of the foregoing embodiments, each of the spars includes an additional spar leg that also extends from the spar flange and through the hollow airfoil fairing.

In a further embodiment of any of the foregoing embodiments, the continuous support ring includes a plurality of additional through-holes. Each of the vane assemblies further include a second spar having a second spar flange and a second spar leg extending radially inwardly from the second spar flange and through the hollow airfoil fairing and one of the additional through-holes. The second spar flange is affixed at the radially outward side of the continuous support ring.

A further embodiment of any of the foregoing embodiments includes at least one cover plate radially constraining the spar flanges to affix the spar flanges to the continuous support ring.

In a further embodiment of any of the foregoing embodiments, the continuous support ring includes a plurality of upstanding ridges on the radially outer side adjacent to the spar flanges. The plurality of upstanding ridges axially and tangentially constraining the spar flanges.

In a further embodiment of any of the foregoing embodiments, the at least one cover plate is a continuous ring.

In a further embodiment of any of the foregoing embodiments, the at least one cover plate comprises a plurality of cover plates in a circumferential row. Each of the cover plates radially constraining one of the spar flanges.

In a further embodiment of any of the foregoing embodiments, the at least one cover plate comprises a first cover plate radially constraining an axially forward end of the spar flange and a second cover plate radially constraining an axially aft end of the spar flange.

In a further embodiment of any of the foregoing embodiments, the continuous support ring includes at least one wall extending in a radial direction from the radially outer side thereof at an axially forward or an axially aft edge of the continuous support ring, and the at least one cover plate is affixed to the at least one wall.

A further embodiment of any of the foregoing embodiments includes fasteners extending through the spar flanges to the radially inner side of the continuous support ring to further affix the spar flanges to the continuous support ring.

In a further embodiment of any of the foregoing embodiments, the spar flanges include at least one radially protruding lip at an axially forward end or axially aft end, the at least one radially protruding lip configured to mate with the at least one cover plate.

A gas turbine engine according to an example of the present disclosure includes a compressor section, a combustor in fluid communication with the compressor section, and a turbine section in fluid communication with the combustor. The turbine section has a vane system having a plurality of vane assemblies arranged circumferentially about an axis. Each of the vane assemblies has a hollow airfoil fairing and a spar. The spar has a spar flange and a spar leg that extends radially inwardly from the spar flange and through the hollow airfoil fairing. A continuous support ring has radially inner and outer sides and defines a circumferential row of through-holes between the radially inner and outer sides. The spar legs extend through the through-holes, and the spar flanges are affixed at the radially outer side of the continuous support ring.

A further embodiment of any of the foregoing embodiments includes an engine case surrounding the turbine section and wherein the continuous support ring is mounted to the engine case.

A further embodiment of any of the foregoing embodiments includes at least one cover plate radially constraining the spar flanges to affix the spar flanges to the continuous support ring.

In a further embodiment of any of the foregoing embodiments, the at least one cover plate is integral with the engine case.

In a further embodiment of any of the foregoing embodiments, the at least one cover plate comprises a first cover plate radially constraining an axially forward end of the spar flange and a second cover plate radially constraining an axially aft end of the spar flange, both of said first and second cover plates integral with the engine case.

In a further embodiment of any of the foregoing embodiments, the continuous support ring defines an annular plenum, and each of the spar legs includes a through-passage fluidly connected with the annular plenum.

In a further embodiment of any of the foregoing embodiments, the continuous support ring defines an annular planum, and each of the spar legs includes a through-passage fluidly connected with the annular planum.

A method for fabricating a vane system according to an example of the present disclosure includes providing a plurality of vane assemblies arranged circumferentially about an axis. Each of the vane assemblies have a hollow airfoil fairing and a spar. The spar has a spar flange and a spar leg extending radially inwardly from the spar flange and through the hollow airfoil fairing. The method further includes providing a continuous support ring having radially inner and outer sides and defining a circumferential row of through-holes between the radially inner and outer sides. The spar legs are inserted through the through-holes and the spar flanges are affixed at the radially outer side of the continuous support ring.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
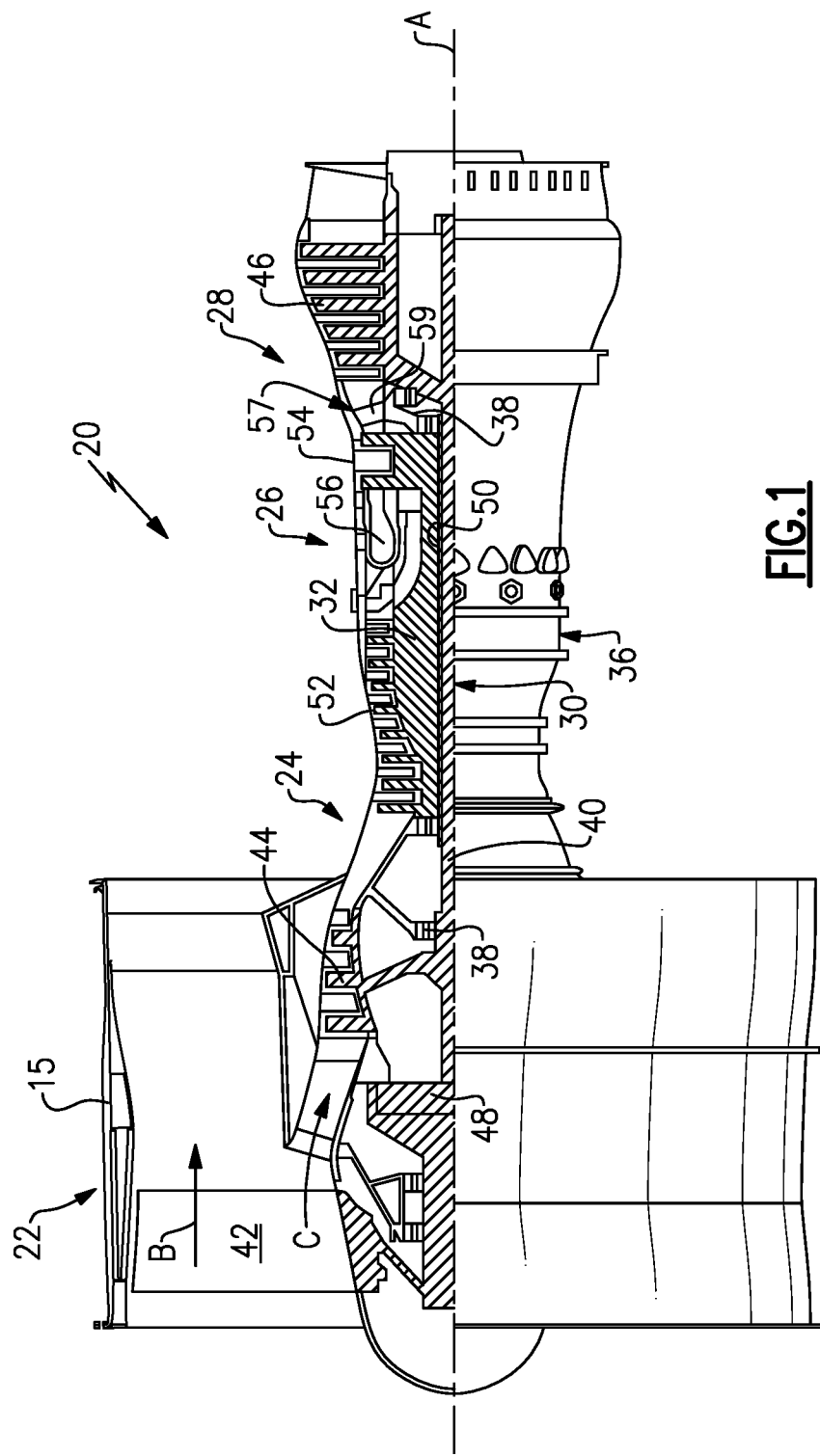
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')" is the industry standard parameter of 1 bm of fuel being burned divided by 1 bf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(\text{Tram } ° \text{R})/(518.7° \text{R})]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
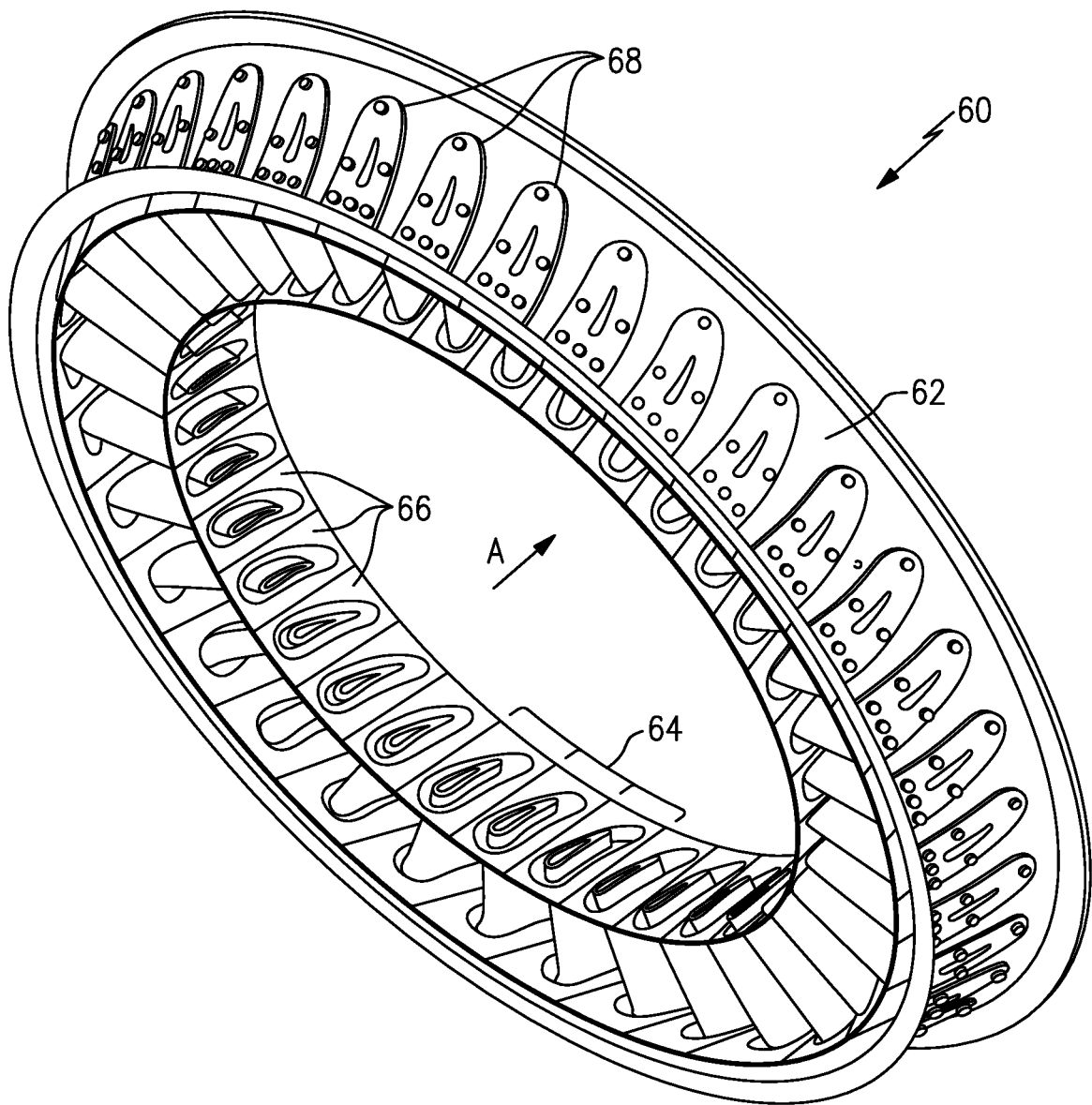
FIG. 2 illustrates a vane system from the engine.

FIG. 2 illustrates a vane system 60 from the turbine section 28 of the engine 20. Although the vane system 60 is shown and described with reference to application in the turbine section 28, it is to be understood that the examples herein are also applicable to structural vanes in other sections of the engine 20.

The vane system 60 is comprised of a continuous support ring 62 and a plurality of vane assemblies 64 arranged circumferentially about the engine central longitudinal axis A. Each vane assembly 64 includes a hollow airfoil fairing 66 and a spar 68 that is attached to the continuous support ring 62 to support the hollow airfoil fairing 66.

Figure 3:
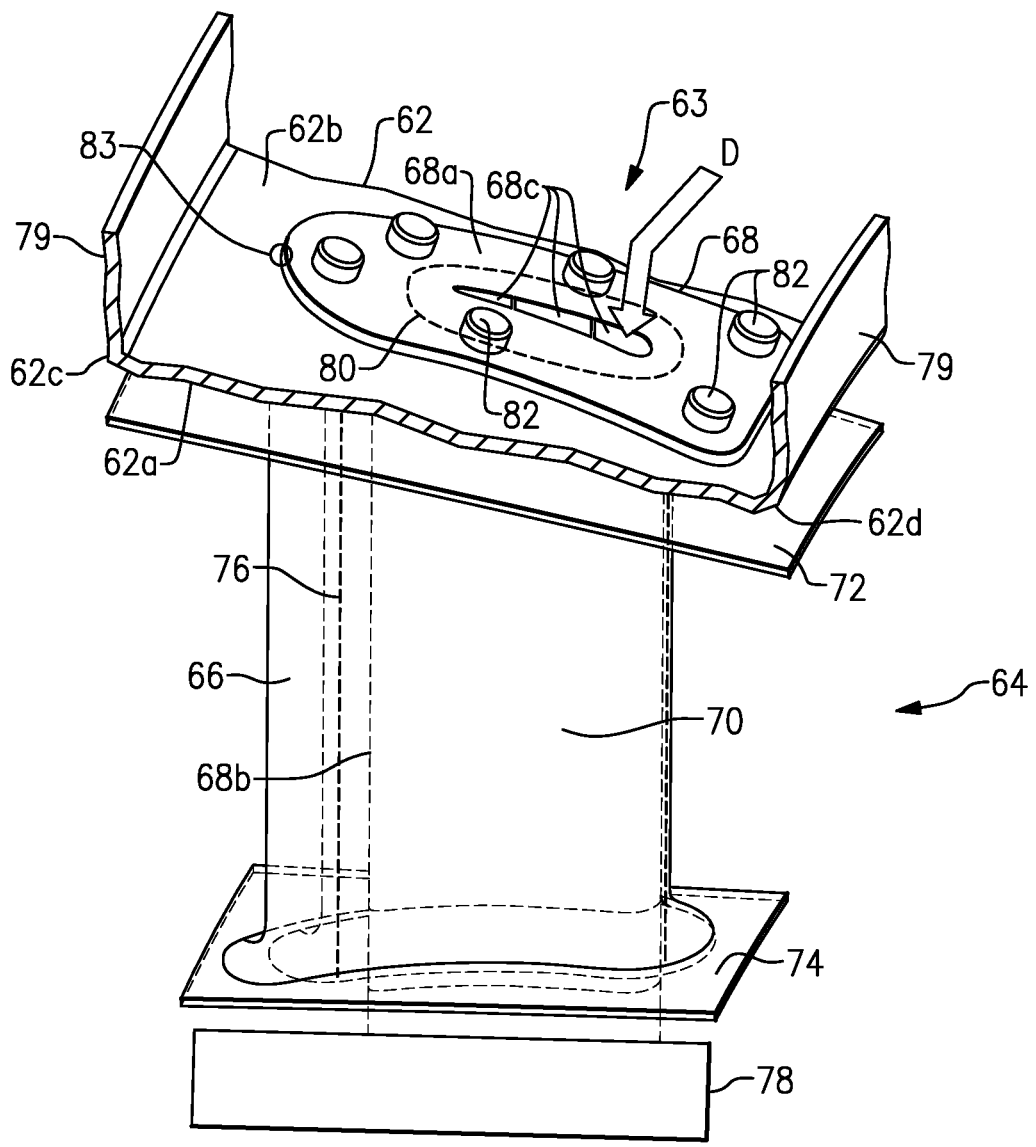
FIG. 3 illustrates a vane assembly from the vane system.

FIG. 3 illustrates an example of one of the vane assemblies 64. The hollow airfoil fairing 66 includes several sections, including an airfoil section 70, and first and second platforms 72/74, between which the airfoil section 70 extends. The airfoil section 70 circumscribes an interior through-cavity 76 and generally extends in a radial direction relative to the central engine longitudinal axis A. The terms such as "inner" and "outer" refer to location with respect to the central engine axis A, i.e., radially inner or radially outer. Moreover, the terminology "first" and "second" used herein is to differentiate that there are two architecturally distinct components or features. It is to be further understood that the terms "first" and "second" are interchangeable in that a first component or feature could alternatively be termed as the second component or feature, and vice versa.

The hollow airfoil fairing 66 is continuous in that the platforms 72/74 and the airfoil section 70 constitute a unitary body. As an example, the airfoil fairing 66 is formed of a ceramic matrix composite, an organic matrix composite (OMC), or a metal matrix composite (MMC). For instance, the ceramic matrix composite (CMC) is formed of ceramic fiber tows that are disposed in a ceramic matrix. The ceramic matrix composite may be, but is not limited to, a SiC/SiC ceramic matrix composite in which SiC fiber tows are disposed within a SiC matrix. Example organic matrix composites include, but are not limited to, glass fiber tows, carbon fiber tows, and/or aramid fiber tows disposed in a polymer matrix, such as epoxy. Example metal matrix composites include, but are not limited to, boron carbide fiber tows and/or alumina fiber tows disposed in a metal matrix, such as aluminum. A fiber tow is a bundle of filaments. As an example, a single tow may have several thousand filaments. The tows may be arranged in a fiber architecture, which refers to an ordered arrangement of the tows relative to one another, such as, but not limited to, a 2D woven ply or a 3D structure.

The spar 68 mechanically supports the hollow airfoil fairing 66. The spar 68 in this example includes a spar flange 68*a* and a spar leg 68*b* that extends from the spar flange 68*a*. The spar leg 68*b* extends through the through-cavity 76 and protrudes from the platform 74 of the airfoil fairing 66. The end of the spar leg 68*b* is received through support hardware 78 and is secured thereto by an attachment, such as a pin, so as to trap the airfoil fairing 66 between the support hardware 78 and the spar flange 68*a*.

The spar leg 68*b* defines one or more interior through-passages 68*c*. Cooling air, such as bleed air from the compressor section 24, is conveyed into and through the through-passage 68*c* of the spar 68. This cooling air may be destined for a downstream cooling location, such as a tangential onboard injector (TOBI). Cooling air may also be provided into the cavity 76 for cooling of the airfoil section 70.

The continuous support ring 62 is secured to a fixed support structure (not shown), such as engine static structure 36 or an engine case. The continuous support ring 62 is axisymmetric and extends endlessly around the central engine axis A. The continuous support ring 62 has a radially inner and outer sides 62*a*/62*b* and a circumferential row of through-holes 80 that extend between the radially inner and outer sides 62*a*/62*b*. The continuous support ring 62 may be formed of a metal alloy, such as a nickel- or cobalt-based alloy. In one example, the continuous support ring 62 is formed of a single, monolithic body that is free of any mechanical joints or seams, such as weld joints. In other examples, however, the continuous support ring 62 may be formed of arc segments that are welded or otherwise metallurgically attached together to form one continuous ring. Thus, the continuous support ring 62 is free of any inter-segment spaced joints.

The continuous support ring 62 further includes walls 79 that extend in a radial direction from the radially outer side 62*b* at an axially forward edge 62*c* and an axially aft edge 62*d*. The walls 79 and radially outer side 62*b* of the continuous support ring 62 define three sides of an annular plenum 63, which may be used to deliver cooling air, illustrated as arrow D, to the through-passages 68*c* of the spar 68. The annular plenum 63 may further be enclosed by the fixed support structure that the continuous support ring 62 is attached to.

As illustrated in FIG. 3, the spar leg 68*b* extends radially inwardly through the through-hole 80. The spar flange 68*a* is affixed at the radially outer side 62*b* of the continuous support ring 62 by a plurality of fasteners 82 that extend through the spar flanges 68*a* and the continuous support ring 62 to the radially inner side 62*a* of the continuous support ring 62. The fasteners 82 may be, but are not limited to, screws, rivets, or bolts. Alternatively, or in combination with the fasteners 82, the spar flange 68*a* may be welded to the outer side 62*b* of the continuous support ring 62 at a weld joint 83.

The continuous support ring 62 facilitates robust support of the vane assemblies 64 because it is free of inter-segment spaced joints, and thus, is relatively stiff. Further, the absence of inter-segment spaced joints facilitates assembly and manufacturing of the vane system 60, and also facilitates easier positioning of the vane system 60 and affixture of vane system 60 to engine case 36 because there are fewer pieces to manufacture and install. The configuration also facilitates sealing of the annular plenum 63 for delivery of the cooling air to the through-passages 68c because there are fewer potential leak paths without inter-segment spaced joints.

Figure 4:
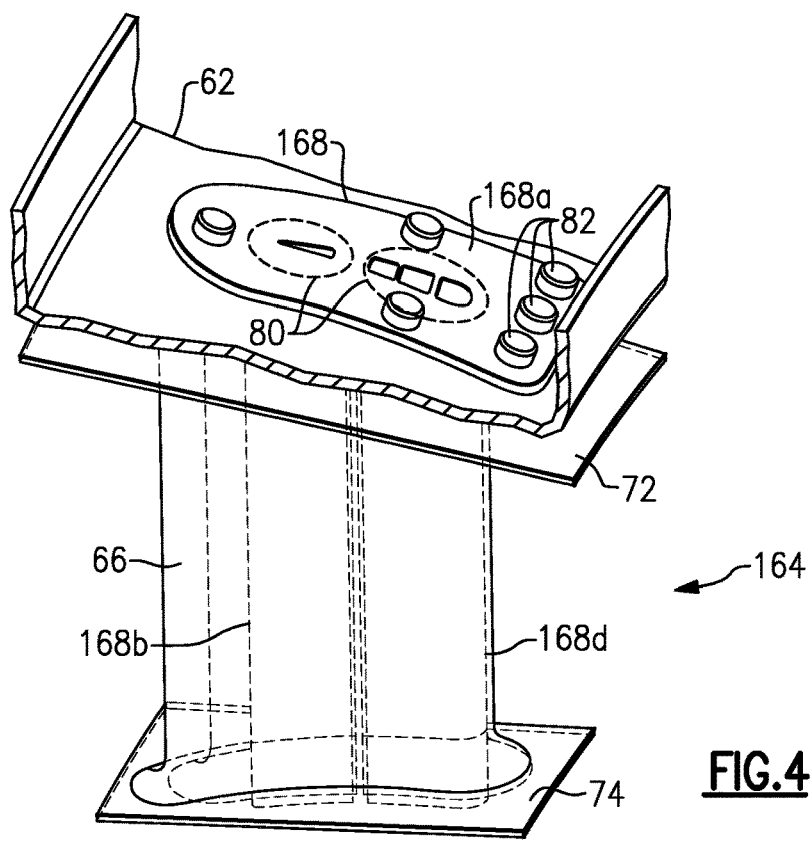
FIG. 4 illustrates another example vane assembly with a spar that has two spar legs.

FIG. 4 illustrates another example vane assembly 164 for the vane system 60. In this disclosure, like reference numerals designate like elements where appropriate and reference numerals with the addition of one-hundred or multiples thereof designate modified elements that are understood to incorporate the same features and benefits of the corresponding elements.

In the vane assembly 164 the spar 168 includes two spar legs 168b/168d that extend from the spar flange 168a and through the hollow airfoil fairing 66. The spar legs 168b/168d may both extend through a single through-hole 80 of the continuous support ring 62, or the continuous support ring 62 may include two through-holes 80 such that each spar leg 168b/168d extends through a respective through hole 80. The use of multiple spar legs 168b/168d may facilitate a more robust mechanical support of the airfoil fairing 66. Although two spar legs 168b/168d are shown, the spar 168 may include additional spar legs for added stiffness and support of the airfoil fairing 66 if space allows.

Figure 5:
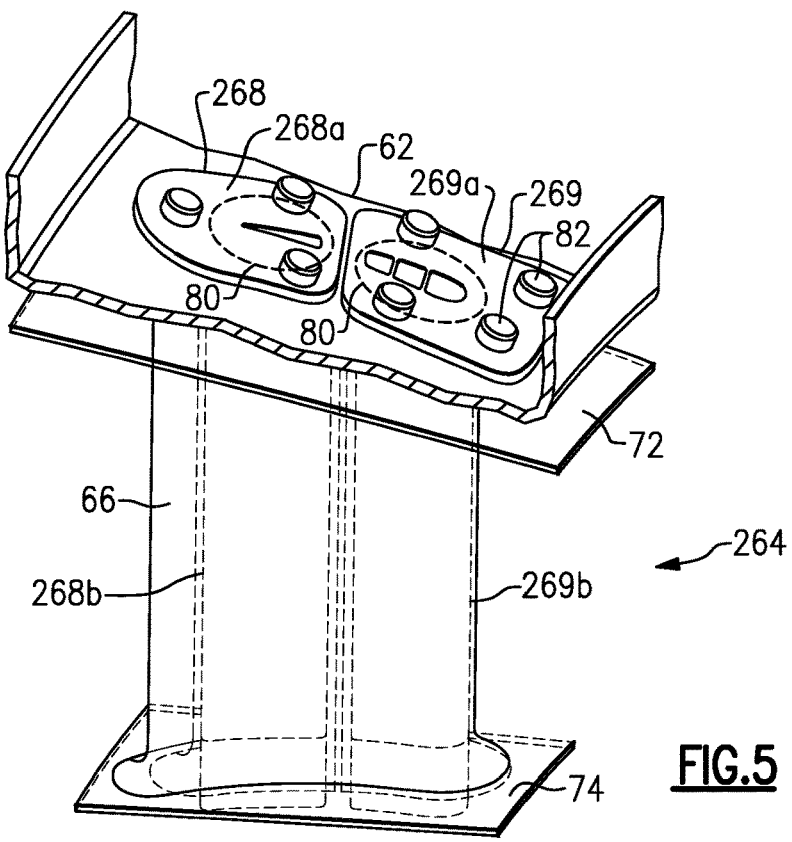
FIG. 5 illustrates another example vane assembly with a two spars.

FIG. 5 illustrates another example vane assembly 264. The vane assembly 264 in this example includes a first spar 268 and a second spar 269, each with a respective spar flange 268a/269a and spar leg 268b/269b. The spar legs 268b/269b extend radially inwardly from the spar flanges 268a/269a, through the through-holes 80 of the continuous support ring 62, and through the hollow airfoil fairing 66. The spar flanges 268a/269a of the first and second spars 268/269 are both affixed at the radially outer side 62b of the continuous support ring 62 by fasteners 82. Although two spars 268/269 are shown, additional spars may be included and affixed to the continuous support ring 62 if desired and space allows.

The use of the two spars 268/269 may facilitate assembly of the vane assembly 264. For instance, if an airfoil section has an extreme bow and/or twist or there is a tight fit with two spar legs that are attached to a common spar flange, insertion of the spar legs into the airfoil section may not be possible due to interference. However, by having two separate spars 268/269, each one can be independently manipulated for insertion without constraint by the other.

Figure 6:
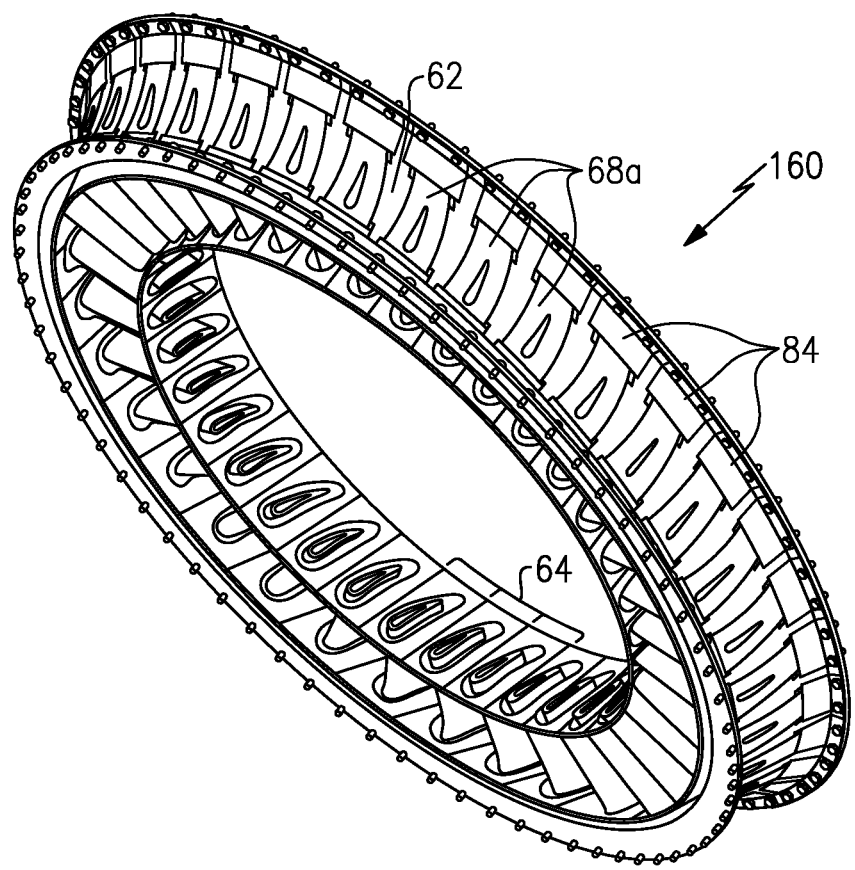
FIG. 6 illustrates another example vane system with cover plates.
Figure 7:
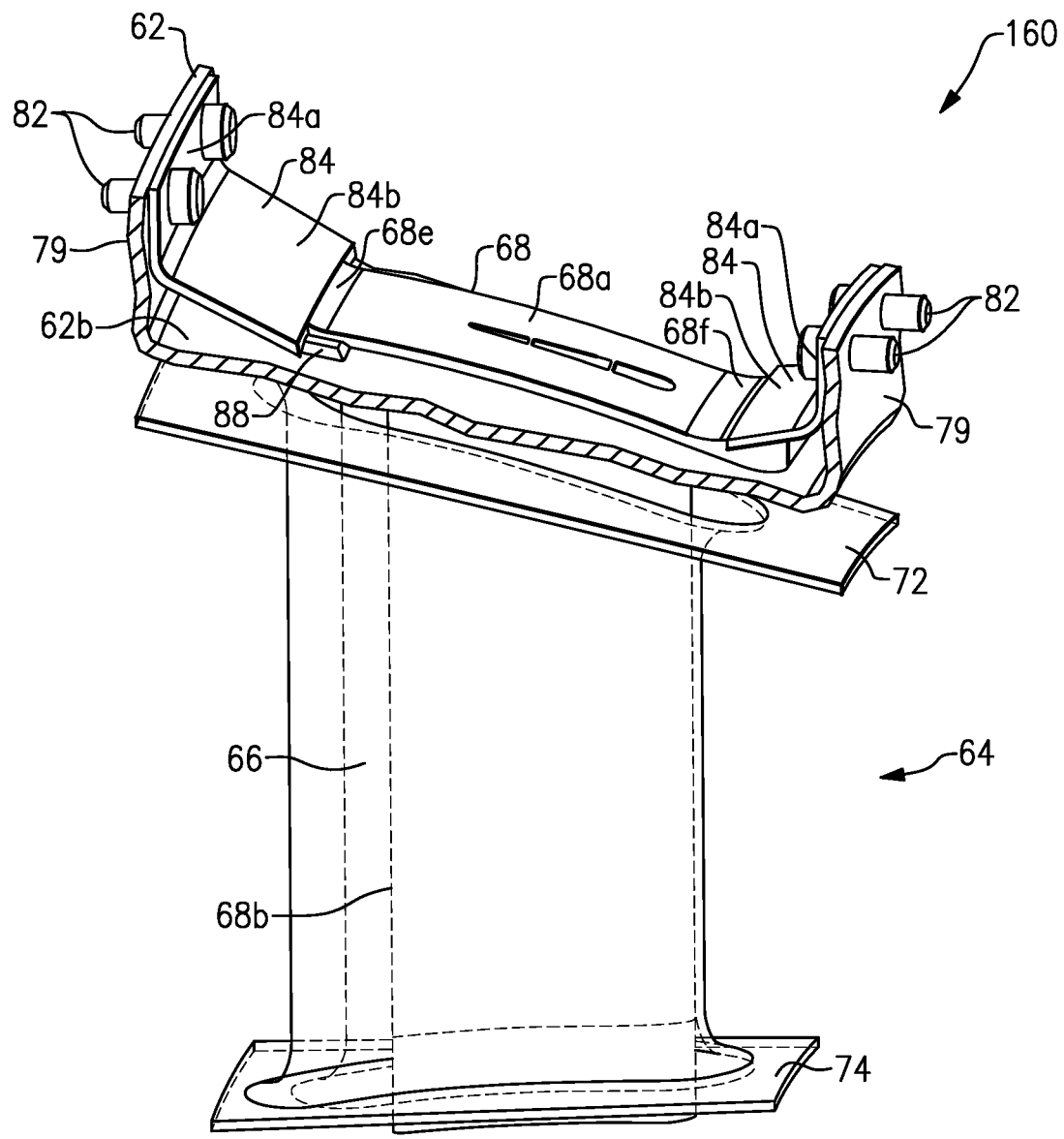
FIG. 7 illustrates a vane assembly from the vane system of FIG. 6.

FIG. 6 illustrates another example vane system 160 in which a plurality of cover plates 84 affix the vane assemblies 64 to the continuous support ring 62 instead of fasteners as in the previous examples. As shown in FIG. 7, each of the cover plates 84 includes a radial leg 84a and an axial leg 84b that form an L-shape. The radial leg 84a is affixed to the wall 79 of the continuous support ring 62 by the fasteners 82 that extend through the radial leg 84a and the wall 79. The axial leg 84b clamps the spar flange 68a to the radially outer side 62b of the continuous support ring 62 so as to radially constrain the spar flange 68a. In this example, there are two cover plates 84 at, respectively, an axially forward end 68e of the spar flange 68a and an axially aft end 68f of the spar flange 68a. Thus, each set of two cover plates 84 radially constrains one spar flange 68a. Use of discrete sets of two cover plates 84 for each flange 68a allows the clamping force and positioning of each cover plate 84 to be individually adjusted for each spar flange 68a, which may facilitate tailoring of the configuration to account for dimensional tolerances.

Figure 8:
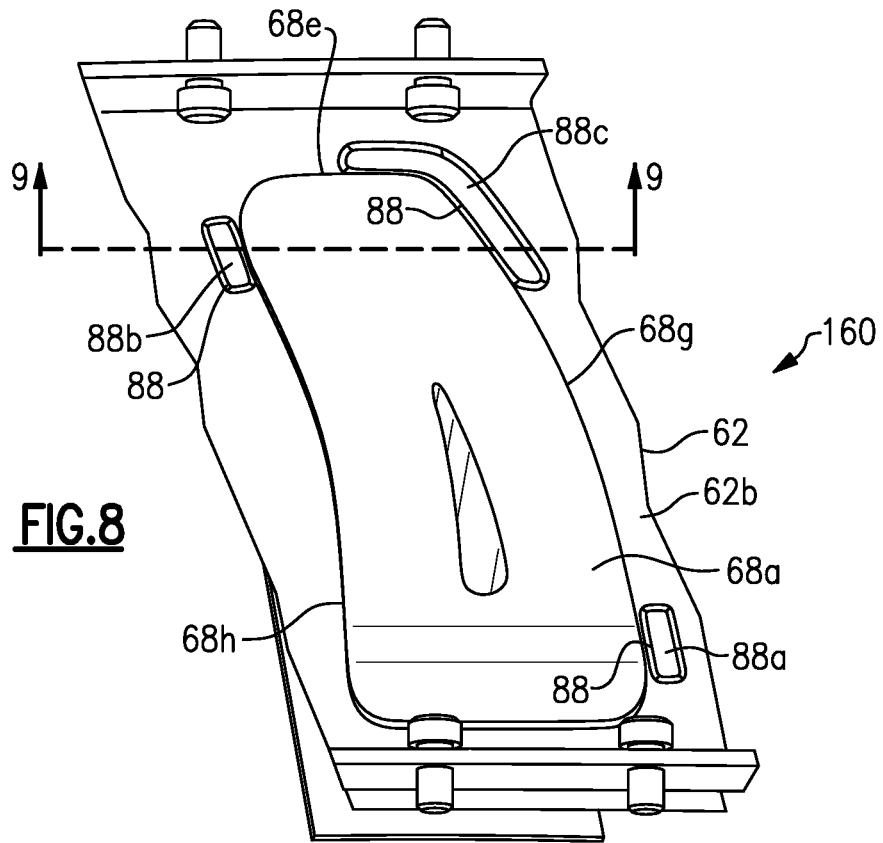
FIG. 8 illustrates a radial inward view of the vane assembly of FIG. 7.

FIG. 8 illustrates a radial inward view of the vane system 160, excluding the cover plates 84. The continuous support ring 62 includes a plurality of upstanding ridges 88 on the radially outer side 62b. The upstanding ridges 88 are at positions adjacent to the spar flange 68a, such that the upstanding ridges 88 axially and tangentially constrain movement of the spar flange 68a. In this example, a first upstanding ridge 88a and second upstanding ridge 88b are elongated in an axial direction and abut a first tangential end 68g and second tangential end 68h of the spar flange 68a respectively. A third upstanding ridge 88c includes an elbow such that it abuts both first tangential end 68g and axially forward end 68e of spar flange 68a. It is to be appreciated that the aerodynamic loads on the airfoil fairing 66 that are transmitted to the spar 68 may tend to always move the spar 68 (and thus the spar flange 68a) in the same direction. In this regard, the locations of the upstanding ridges 88 may be selected in accordance with the directional movement tendency of the spar platform 68a for the given aerodynamic loads.

Figure 9:
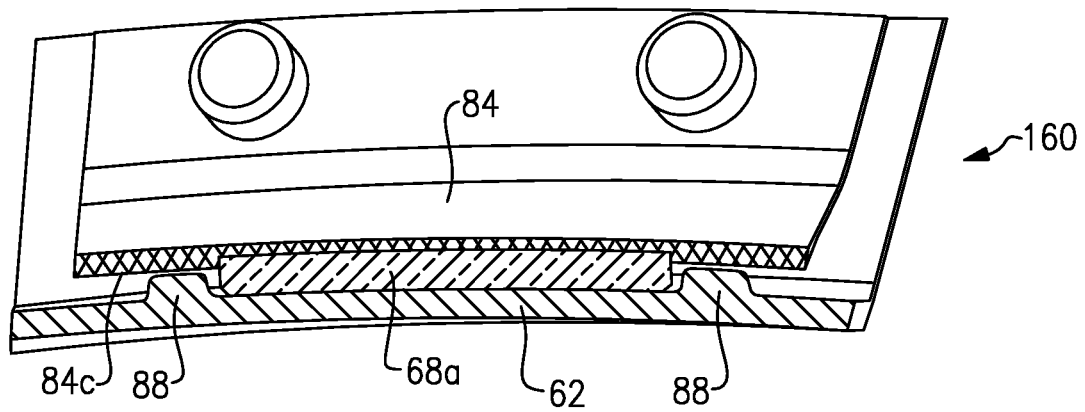
FIG. 9 illustrates a cross-sectional view of the example vane assembly of FIG. 8 taken along line 9-9.

FIG. 9 illustrates a cross-sectional view of vane system 160 taken along line 9-9 of FIG. 8 (but with the cover plate 84). The cover plates 84 are rigid components with a radially inner face 84c facing the spar flange 68a. The radially inner face 84c is positioned radially outwards of the spar flange 68a and mates with the spar flange 68a as an interference fit. Accordingly, the spar flange 68a abuts the cover plates 84 and is thereby constrained from moving radially, while the upstanding ridges 88 constrain tangential and axial movement.

Figure 10:
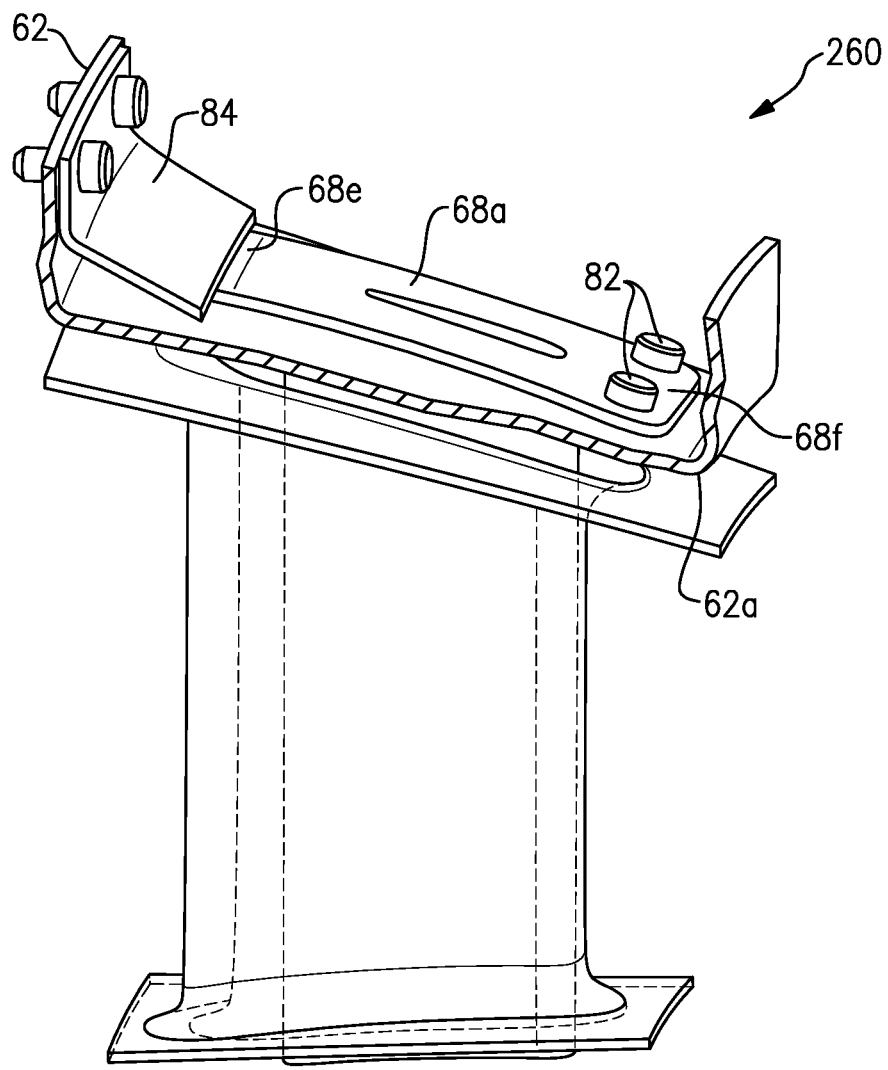
FIG. 10 illustrates another example vane assembly with a cover plate and fasteners.

FIG. 10 illustrates an example vane system 260 that is a combination of the examples of FIGS. 3 and 7. Here, the cover plate 84 radially constrains the axially forward end 68e of the spar flange 68a, and the fasteners 82 extend through the axially aft end 68f of the spar flange 68a to the radially inner side 62a of the continuous support ring 62. Alternatively, the cover plate 84 may radially constrain the axially aft end 68f of the spar flange 68a and the fasteners 82 may extend through the axially forward end 68e.

Figure 11:
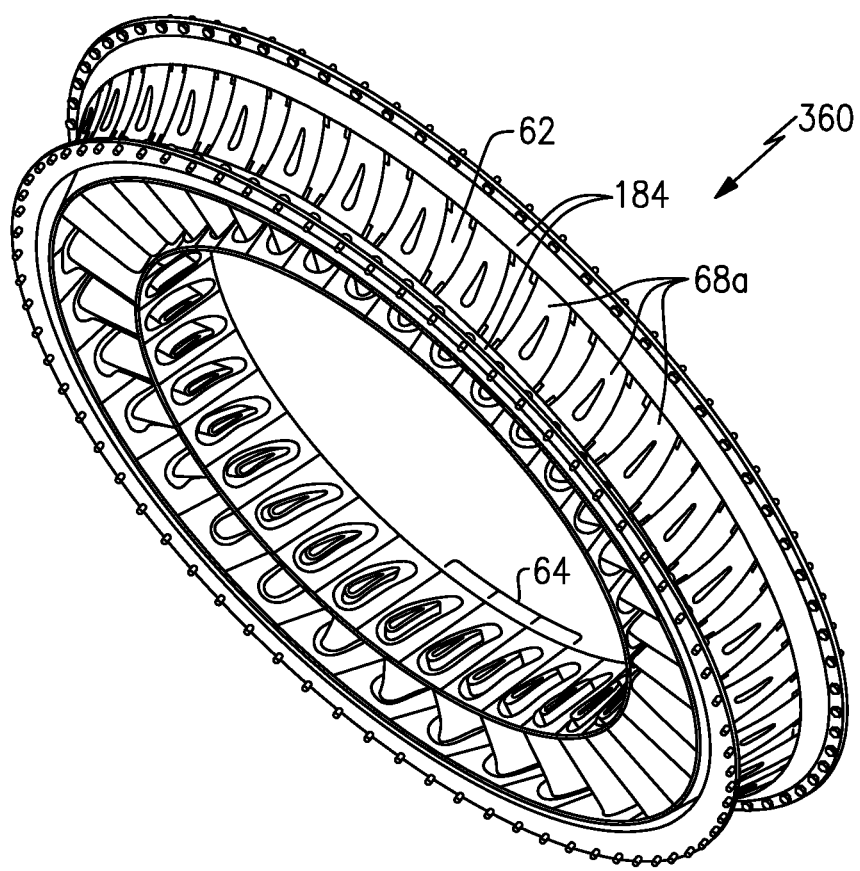
FIG. 11 illustrates another example vane system with a cover plate that is a continuous ring.

FIG. 11 illustrates an example vane system 360 that is similar to the example in FIG. 6 except that the cover plates 184 are continuous rings that radially constrain all of the spar flanges 68a of the plurality of vane assemblies 64 on continuous support ring 62. In this example, one cover plate 184 radially constrains the axially forward end 68e of the spar flanges 68a and another cover plate 184 radially constrains the axially aft end 68f of the spar flanges 68a. The use of continuous ring cover plates 184, rather than the plurality of discrete cover plates 84 as in FIG. 10, eliminates the use of multiple pieces and thereby facilitates assembly and manufacturing of vane system 360. However, while assembly may be easier, the continuous ring cover plates 184 cannot be tailored to the individual tolerances of the spar flanges 68a as the discrete cover plates 84 can.

Figure 12:
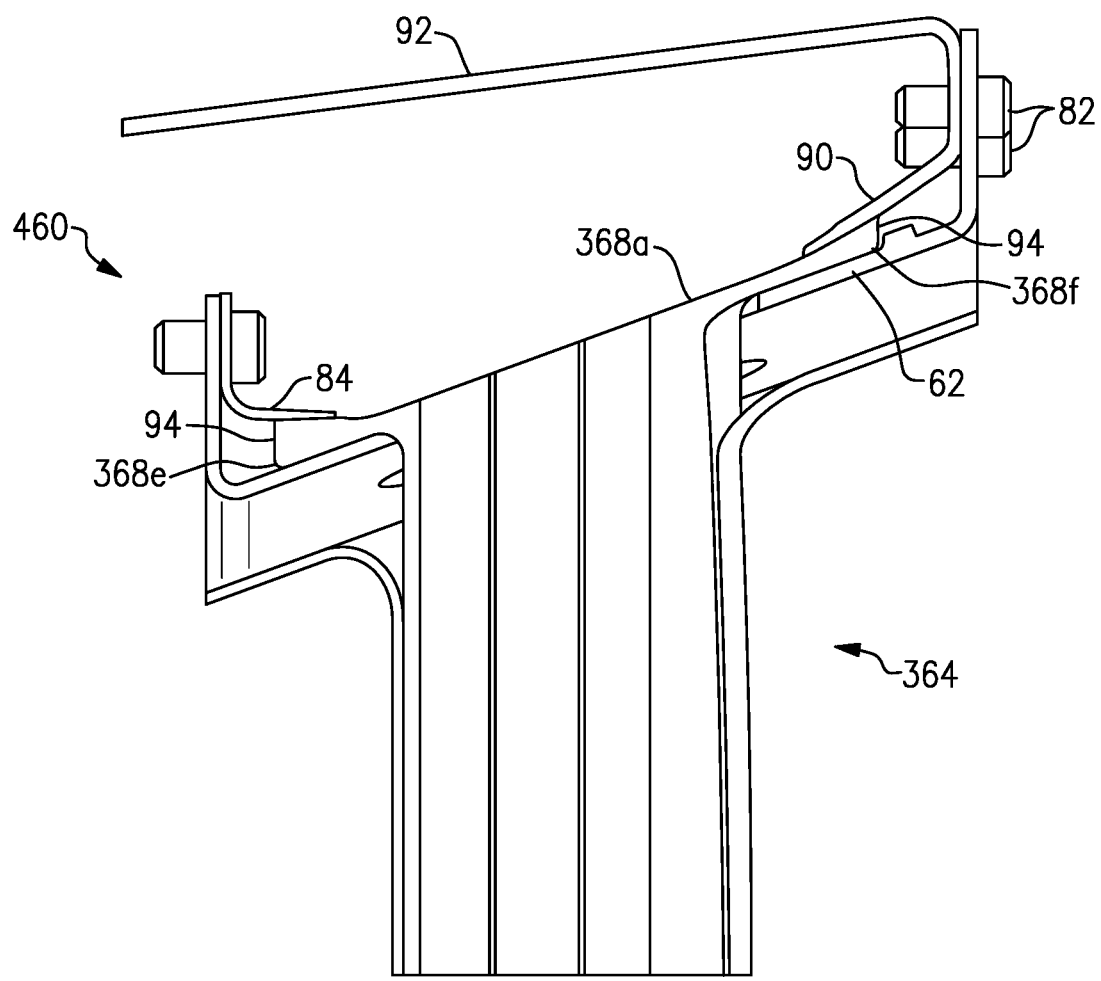
FIG. 12 illustrates another example vane system with a cover plate that is continuous with a support structure.

FIG. 12 illustrates an example vane system 460 including a first cover plate 90 and second cover plate 84 both radially constraining the spar flange 368a of the vane assembly 364 on the continuous support ring 62. In this example, the first cover plate 90 is integral with a support structure 92, which may be attached to, or integral with, the engine case 36. For example, the first cover plate 90 is configured as an extension arm that protrudes from the support structure 92. Fasteners 82 attach the first cover plate 90 to the continuous support ring 62, and also attach vane system 460 to the support structure 92. Such a configuration reduces the number of components by eliminating some of the prior described cover plates 84.

As shown in FIG. 12, the spar flange 368a also includes radially-protruding lips 94 at both axially forward and aft ends 368e/368f of the spar flange 368a. The geometry of the lips 94 match the geometry of the under-surfaces the cover plates 84/90 such that the lips 94 make area contact with the cover plates 84/90 (as opposed to point or line contact). The area contact facilitates load distribution to thereby enhance constraint of the spar flanges 368a.

Figure 13:
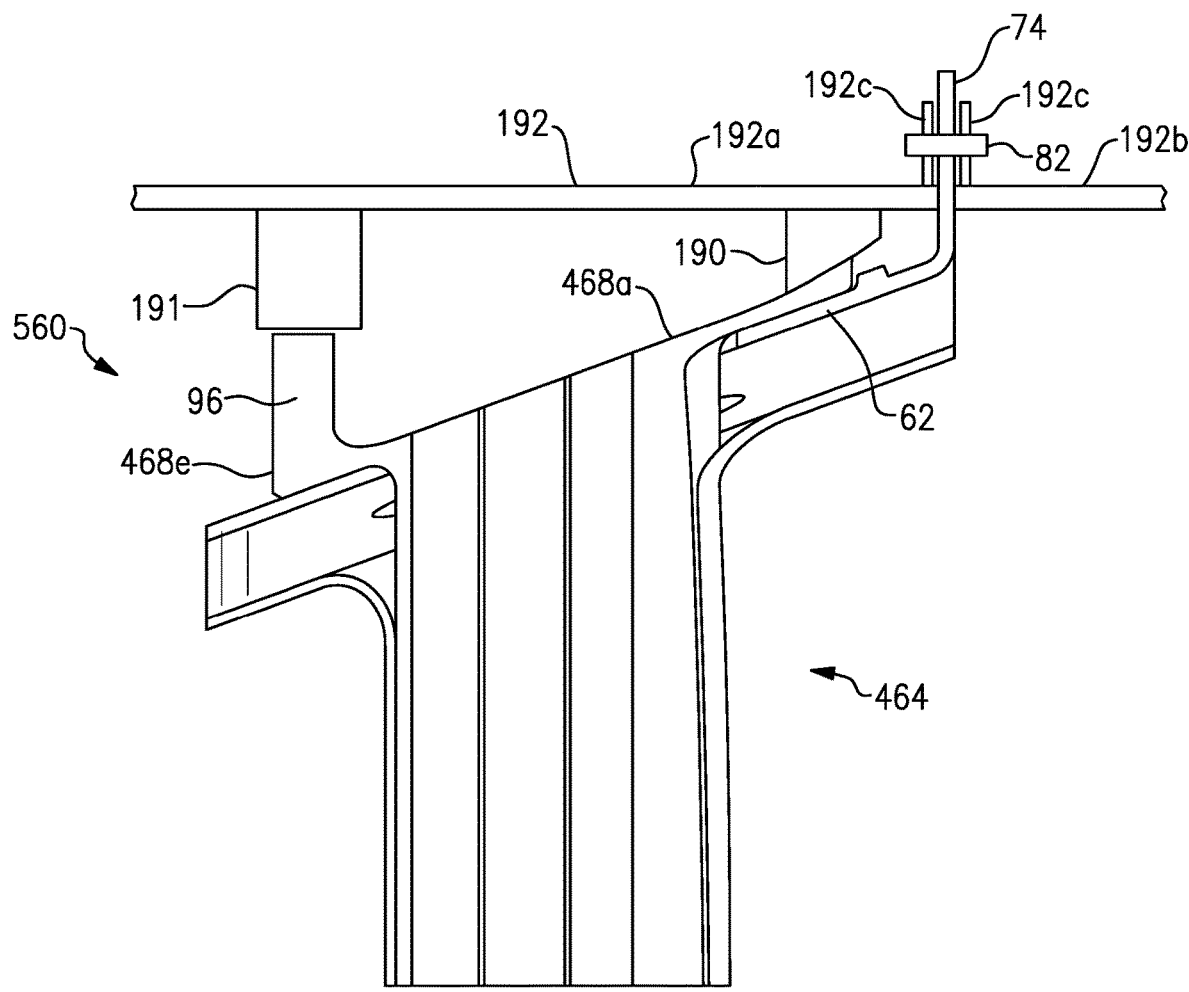
FIG. 13 illustrates another example vane system with two cover plates that are continuous with a support structure.

FIG. 13 illustrates an example vane system 560 that is similar to the example in FIG. 12 except that both a first cover plate 190 and a second cover plate 191 are integral with a support structure 192, such as an engine case. The first and second cover plates 190/191 extend radially inwardly from the support structure 192 to radially constrain the spar flange 468a of the vane assembly 464 on the continuous support ring 62. The axially forward end 468e of the spar flange 468a includes a radially outwardly extending wall 96 that interfaces with the second cover plate 191. In the illustrated example, the support structure 192 includes case sections 192a/192b that each have a radial flange 192c. In this example, a wall 79 of the continuous support ring 62 is sandwiched axially between the flanges 192c and a fastener 82 extends through the flanges 192c and the wall 79 to secure the case sections 192a/192b together and also attach vane system 560 to the support structure 192. Similar to the example in FIG. 12, such a configuration further reduces the number of components in the system.

Referring back to FIGS. 2-5, the example vane system 60 uses radially-oriented fasteners 82 to secure the spar flanges 68a to the continuous support ring 62. However, there may be spatial limitations when installing a vane system that limits the use of such radially-oriented fasteners. For example, there may not be space between the platform 72 and the continuous support ring 62 for the radially-oriented fasteners 82 to extend through the radially inner side 62a of the continuous support ring 62. If such spatial limitations are present, the example vane systems 160, 260, 360, 460, and 560 illustrated in FIGS. 6-13 may be used to eliminate the fasteners and instead use the cover plates, which do not require space between the platform 72 and the continuous support ring 62.

Figure 14:
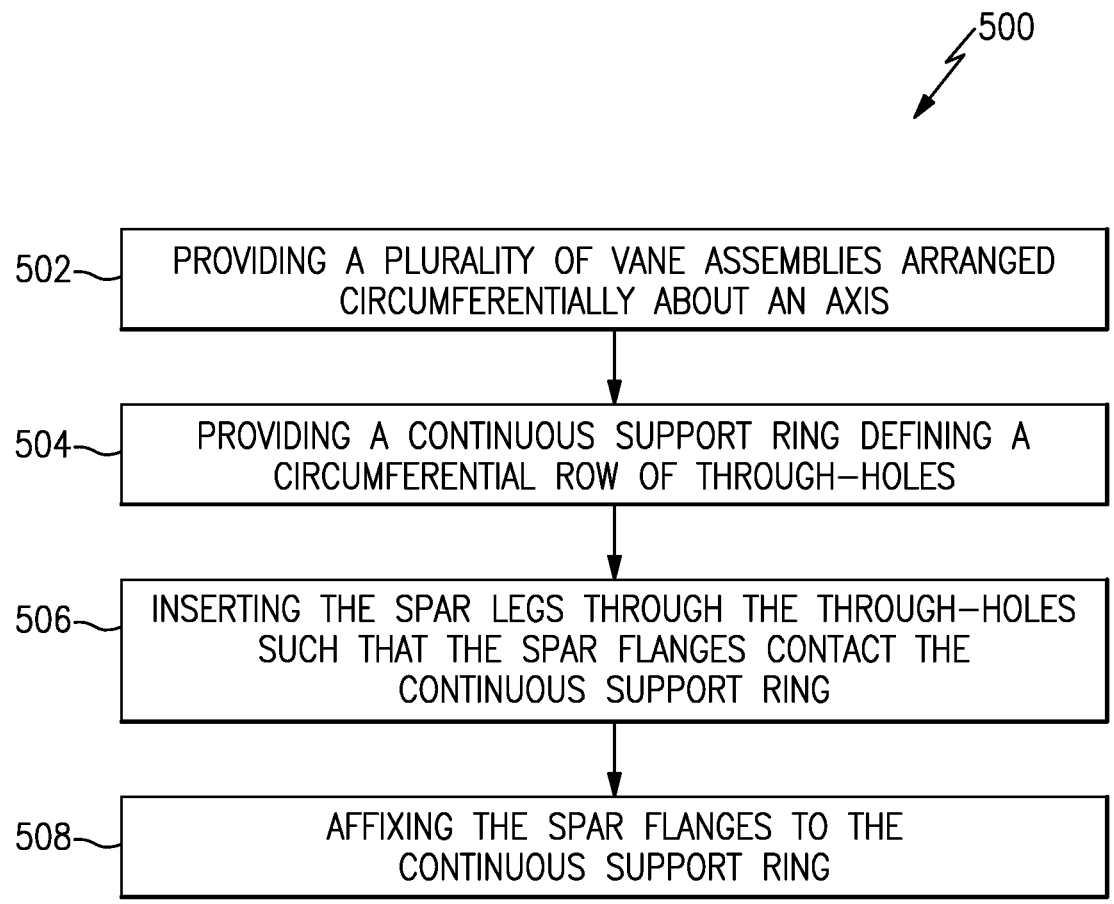
FIG. 14 illustrates a method of fabricating a vane system.

FIG. 14 illustrates a method 500 of fabricating the vane system 60 described above. At steps 502 and 504 the vane assemblies 64 and the continuous support ring 62 are provided. Most typically, the vane assemblies 64 and the continuous support ring 62 are furnished as pre-fabricated components. However, the provision of the vane assemblies 64 and/or the continuous support ring 62 may alternatively involve fabrication of one or more of the components of the vane assemblies 64 and/or the continuous support ring 62.

Step 506 includes inserting the spar legs 68b through the through-holes 80 of the continuous support ring 62. The insertion may involve, either manually or through automation, aligning the spar legs 68b with through-holes 80 and moving the spar legs 68b through the through-holes 80 until the spar flanges 68a contact the radially outer side 62b of the continuous support ring 62. Step 508 includes affixing the spar flanges 68a at the radially outer side 62b of the continuous support ring 62. For the example vane system 60, the affixing involves, either manually or through automation, inserting the fasteners 84 through the spar flange 68a and the continuous support ring 62 and tightening the fasteners 84. For the example vane systems 160, 260, 360, and 460, the affixing involves providing a cover plate 84, and then, either manually or through automation, positioning the cover plate 84 radially over the flanges 68a, inserting fasteners 82 through the cover plate 84 and a wall 79 of the continuous support ring 62, and tightening the fasteners 82. Although method 500 has been described with reference to the vane system 60, it is to be understood that the method 500 is also applicable to the vane systems 160, 260, 360, 460, and 560 described above. For the example vane system 560, the affixing involves, either manually or through automation, providing a case section 192a that has integral cover plates 190/191, positioning the support structure 192 such that the cover plates 190/191 are radially over the flanges 68a, inserting a fastener 82 through the case section 192a, a wall 79 of the continuous support ring 62, and a second case section 192b of the support structure 192, and tightening the fastener 82. Further, the vane systems of this disclosure may be dissembled via the reverse procedure of method 500 for repair, component replacement, maintenance, or the like.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A vane system comprising:
    a plurality of vane assemblies arranged circumferentially about an axis, each of the vane assemblies including:
        a hollow airfoil fairing, and
        a spar, the spar having a spar flange and a spar leg extending radially inwardly from the spar flange and through the hollow airfoil fairing, wherein the spar flange extends in an at least partially axial direction from the spar leg and includes a radially outer surface and a radially inner surface;
    a continuous support ring having radially inner and outer sides and defining a circumferential row of through-holes between the radially inner and outer sides, the spar legs extending through the through-holes and the spar flanges being affixed to the continuous support ring such that the radially inner surfaces of the spar flanges contact the outer side of the continuous support ring; and
    at least one cover plate contacting the radially outer surfaces of the spar flanges to radially constrain the spar flanges and affix the spar flanges to the continuous support ring.

2. The vane system of claim 1, further comprising a plurality of fasteners extending through the spar flanges to the radially inner side of the continuous support ring and further affixing the spar flanges to the continuous support ring.

3. The vane system of claim 1, wherein the continuous support ring includes a plurality of upstanding ridges on the radially outer side adjacent to the spar flanges, the plurality of upstanding ridges axially and tangentially constraining the spar flanges.

4. The vane system of claim 1, wherein the at least one cover plate is a continuous ring.

5. The vane system of claim 1, wherein the at least one cover plate comprises a plurality of cover plates in a circumferential row, each of the cover plates radially constraining one of the spar flanges.

6. The vane system of claim 1, wherein the at least one cover plate comprises a first cover plate radially constraining an axially forward end of the spar flange and a second cover plate radially constraining an axially aft end of the spar flange.

7. The vane system of claim 1, wherein the continuous support ring includes at least one wall extending in a radial direction from the radially outer side thereof at an axially forward or an axially aft edge of the continuous support ring, and the at least one cover plate is affixed to the at least one wall.

8. The vane system of claim 1, wherein the spar flanges include at least one radially protruding lip at an axially forward end or axially aft end, the at least one radially protruding lip configured to mate with the at least one cover plate.

9. The vane system of claim 7, wherein the at least one cover plate includes a radial leg and an axial leg, the radial leg affixed to the at least one wall and the axial leg radially constraining at least one spar flange.

10. A gas turbine engine comprising:
a compressor section;
a combustor in fluid communication with the compressor section; and
a turbine section in fluid communication with the combustor, the turbine section having a vane system including:
a plurality of vane assemblies arranged circumferentially about an axis, each of the vane assemblies including:
a hollow airfoil fairing, and
a spar, the spar having a spar flange and a spar leg extending radially inwardly from the spar flange and through the hollow airfoil fairing, wherein the spar flange extends in an at least partially axial direction from the spar leg and includes a radially outer surface and a radially inner surface;
a continuous support ring having radially inner and outer sides and defining a circumferential row of through-holes between the radially inner and outer sides, the spar legs extending through the through-holes and the spar flanges being affixed to the continuous support ring such that the radially inner surfaces of the spar flanges contact the outer side of the continuous support ring; and
at least one cover plate contacting the radially outer surface of the spar flanges to radially constrain the spar flanges and affix the spar flanges to the continuous support ring.

11. The gas turbine engine of claim 10, further comprising an engine case surrounding the turbine section and wherein the continuous support ring is mounted to the engine case.

12. The gas turbine engine of claim 11, wherein the at least one cover plate is integral with the engine case.

13. The gas turbine engine of claim 12, wherein the at least one cover plate comprises a first cover plate radially constraining an axially forward end of the spar flange and a second cover plate radially constraining an axially aft end of the spar flange, both of said first and second cover plates integral with the engine case.

14. The gas turbine engine of claim 10, wherein the continuous support ring includes a plurality of upstanding ridges on the radially outer side adjacent to the spar flanges, the plurality of upstanding ridges axially and tangentially constraining the spar flanges.

15. The gas turbine engine of claim 10, wherein the continuous support ring defines an annular plenum, and each of the spar legs includes a through-passage fluidly connected with the annular plenum.

16. A method for fabricating a vane system, the method comprising:
providing a plurality of vane assemblies arranged circumferentially about an axis, each of the vane assemblies including:
a hollow airfoil fairing, and
a spar, the spar having a spar flange and a spar leg extending radially inwardly from the spar flange and through the hollow airfoil fairing, wherein the spar flange extends in an at least partially axial direction from the spar leg and includes a radially outer surface and a radially inner surface;
providing a continuous support ring having radially inner and outer sides and defining a circumferential row of through-holes between the radially inner and outer sides;
inserting the spar legs through the through-holes; and
affixing the spar flanges to the radially outer side of the continuous support ring with at least one cover plate such that the radially inner surfaces of the spar flanges contact the outer side of the continuous support and the at least one cover plate contacts the radially outer surfaces of the spar flanges to radially constrain the spar flanges.

* * * * *